United States Patent [19]
Tohge et al.

[11] Patent Number: 5,073,722
[45] Date of Patent: Dec. 17, 1991

[54] APPARATUS AND METHOD FOR CLEANING A HEADLAMP AND ACTUATING A WINDSHIELD WIPER

[75] Inventors: Kazuyoshi Tohge; Junichiro Takeshita, both of Yokohama, Japan

[73] Assignee: Jidosha Denki Kogyo K.K., Yokohama, Japan

[21] Appl. No.: 513,522

[22] Filed: Apr. 23, 1990

[30] Foreign Application Priority Data

Apr. 24, 1989 [JP] Japan ................................ 1-47834[U]

[51] Int. Cl.$^5$ .............................................. H02J 1/00
[52] U.S. Cl. .................................. 307/10.1; 15/250 R; 15/250 A; 15/250.12; 318/DIG. 2; 318/444
[58] Field of Search ........... 15/250 A, 250.01, 250.02, 15/250.12; 239/284.1, 284.2; 315/77, 82, 83; 307/9.1, 10.1, 10.8; 318/443, 444, DIG. 2

[56] References Cited

U.S. PATENT DOCUMENTS

| | | | |
|---|---|---|---|
| 3,058,142 | 10/1962 | Pollock | 15/250 A |
| 3,667,082 | 6/1972 | Hoyler | 15/250 A |
| 3,877,104 | 4/1975 | Martin | 15/250 A |
| 3,902,217 | 9/1975 | Bötz et al. | 15/250 A |
| 3,963,969 | 6/1976 | Nottingham | 15/250 A |

FOREIGN PATENT DOCUMENTS

| | | | |
|---|---|---|---|
| 2001775 | 8/1970 | Fed. Rep. of Germany | 15/250.02 |
| 2339660 | 2/1975 | Fed. Rep. of Germany | 239/284.2 |
| 2511091 | 9/1975 | Fed. Rep. of Germany | 15/250 A |
| 2647519 | 4/1978 | Fed. Rep. of Germany | 15/250.02 |
| 2853924 | 7/1980 | Fed. Rep. of Germany | 15/250 A |

Primary Examiner—Philip R. Coe
Assistant Examiner—Gary K. Graham
Attorney, Agent, or Firm—Sughrue, Mion, Zinn, Macpeak & Seas

[57] ABSTRACT

A headlamp cleaner which is provided with a control system for actuating a wiper motor of a wiper apparatus to wipe a windshield when a predetermined time elapses after the ON-operation of a headlamp cleaner switch. This control system also actuates said wiper motor for a predetermined time after the OFF-operation of said headlamp cleaner switch in order to wipe detergent liquid sprayed on said headlamp which also sticks on the windshield surface.

3 Claims, 4 Drawing Sheets

1

APPARATUS AND METHOD FOR CLEANING A HEADLAMP AND ACTUATING A WINDSHIELD WIPER

BACKGROUND OF THE INVENTION

1. Field of the Invention

This invention relates to a headlamp cleaner used for removing foreign matter such as dust, mud and the like on a glass lens of a headlamp of, for example, an automobile by spraying detergent liquid.

2. Description of the Prior Art

Heretofore, there has been used a headlamp cleaner as shown in FIG. 4 and FIG. 5, for example.

That is, a headlamp cleaner shown in the figures comprises a reservoir 100 for storing detergent liquid F, a washer motor 102 for driving a washer pump 102a to feed the detergent liquid F through a feeding pipe 101, a switch 104 for supplying the washer motor 102 with electric power from a power source 103 and a jet 105 connected with the washer pump 102a for spraying the detergent liquid F on a headlamp 51 of a vehicle body.

Said jet 105 is provided in the front vicinity of the headlamp 51, and is so designed as to feed the detergent liquid F stored in the reservoir 100 to the jet 105 through the feeding pipe 101 by the washer pump 102a and to spray it toward a glass lens 51a of the headlamp 51 through said jet 105 by actuating the washer motor 102 according to the operation of the switch 104.

However, when the vehicle body 50 is made in a sloping style in the front part and the face of the glass lens 51a of the head lamp 51 is also sloped similarly to the vehicle body 50, the glass lens 51a of the headlamp 51 by changing the switch 104 and actuating the washer motor 102, and as a result, the detergent liquid F is sometimes splashed rearward from the headlamp 51 and sticks on a windshield 52 after hitting the face of the glass lens 51a in the conventional headlamp cleaner described above. Accordingly, there is a problem in that it is very dangerous to stick the detergent liquid F on the windshield 52 because the driver's front sight is obstructed by said detergent liquid F.

SUMMARY OF THE INVENTION

Therefore, this invention is made in view of the afore-mentioned problem of the prior art, and an object of the invention is to provide a headlamp cleaner which never obstructs the driver's front sight.

The headlamp cleaner according to this invention for spraying detergent liquid stored in a reservoir toward a headlamp through a jet by actuating a washer motor according to ON-operation of a headlamp cleaner switch is characterized by having a control means for interlocking a wiper motor of a wiper apparatus to operation of the headlamp cleaner switch. The control means is provided with a first timer means for actuating the wiper motor when a predetermined time elapses after the ON-operation of said headlamp cleaner switch, and a second timer means for cutting the power supply to the wiper motor when a predetermined time elapses after the OFF-operation of said headlamp cleaner switch in a preferred aspect of this invention. The afore-mentioned construction of the headlamp cleaner is taken as a measure to solve the afore-mentioned problem of the prior art.

The headlamp cleaner according to this invention is so constructed that the windshield is wiped with the wiper blade by actuating the wiper motor provided to the wiper apparatus when a predetermined time elapses after the ON-operation of the headlamp cleaner switch and the wiper motor is actuated for a predetermined time after the OFF-operation of the headlamp cleaner switch according to the control of control means. Therefore, the detergent sticking on the windshield is wiped off from the windshield surface.

DESCRIPTION OF THE PREFERRED EMBODIMENT

The headlamp cleaner according to an embodiment of this invention will be explained below on basis of FIG. 1 to FIG. 3.

Figure 1:
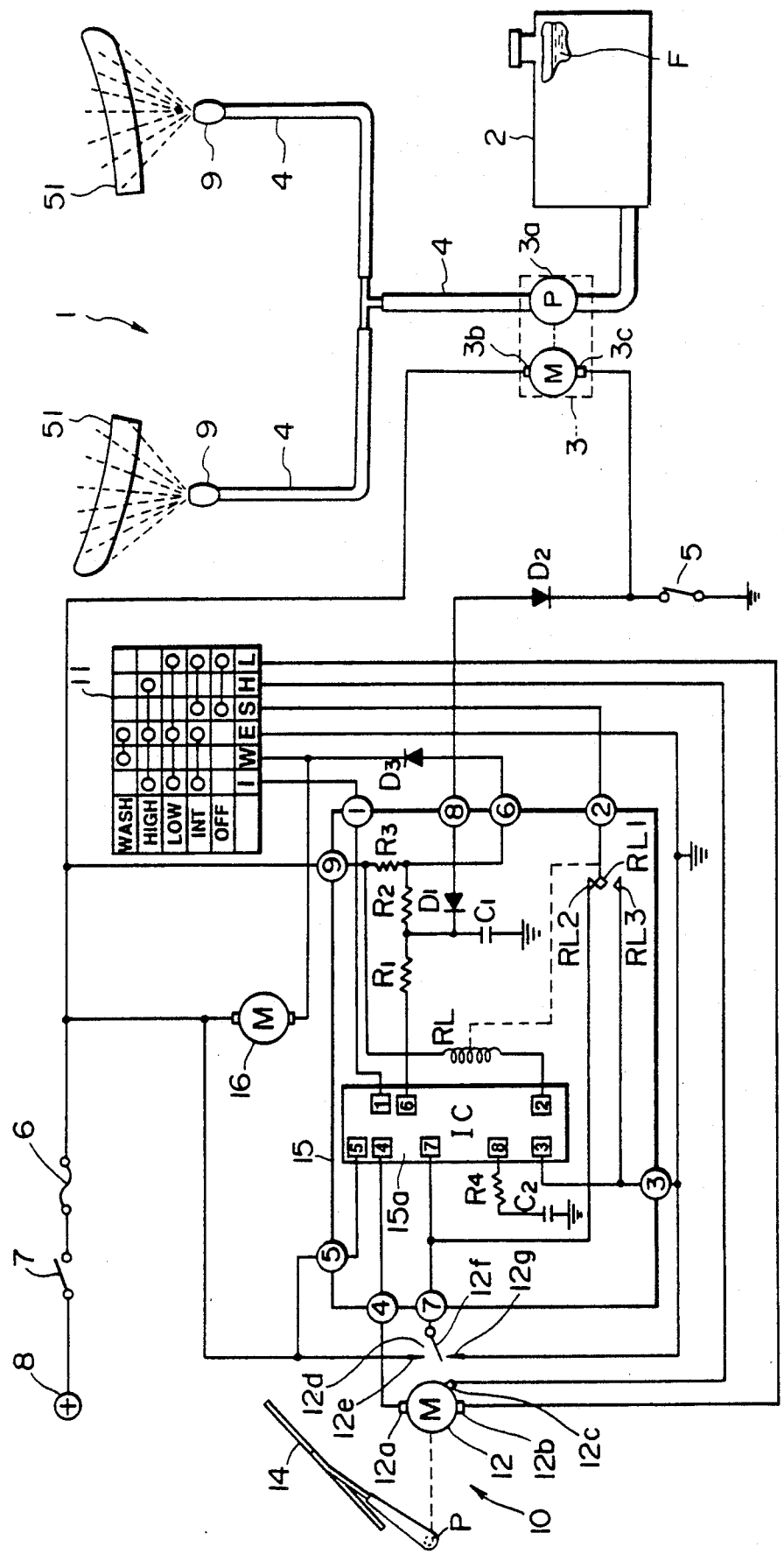
FIG. 1 is a schematic circuit diagram of the headlamp cleaner according to an embodiment of this invention.
Figure 5:
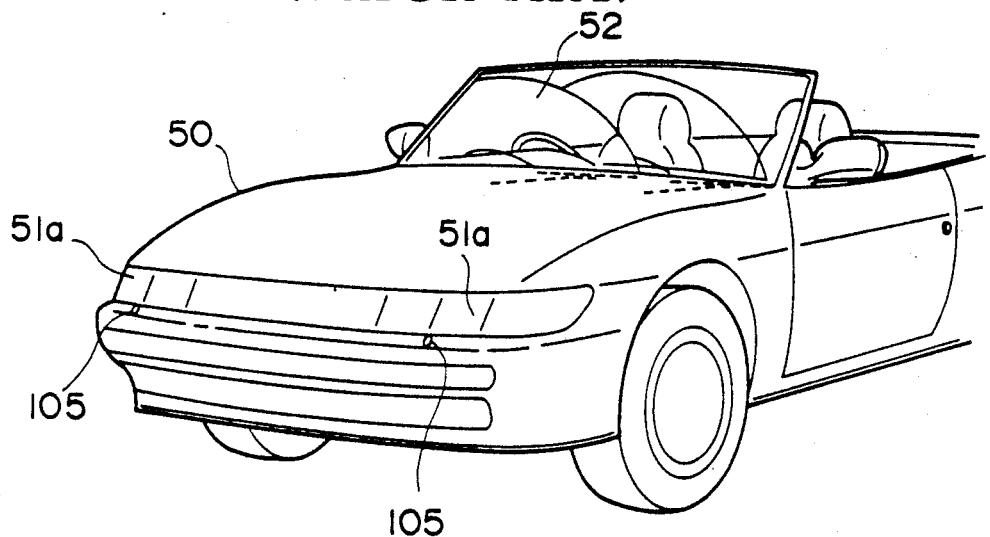
FIG. 5 is an exterior view in a state in which the headlamp cleaner shown in FIG. 1 is furnished on the vehicle body.

Namely, in a headlamp cleaner 1 shown in FIG. 1, numeral 2 is a reservoir for storing detergent liquid F, numeral 3 is a washer motor for driving a washer pump 3a to feed said detergent liquid F through a feeding pipe 4, numeral 5 is a headlamp cleaner switch for supplying the washer motor 3 with electric power from a power source 8 through a fuse 6 and a main switch 7 by grounding, and numeral 9 is a jet connected with the washer pump 3a for spraying the detergent liquid F on the headlamp 51 of the vehicle body similarly to the jet shown in FIG. 5.

Figure 3:
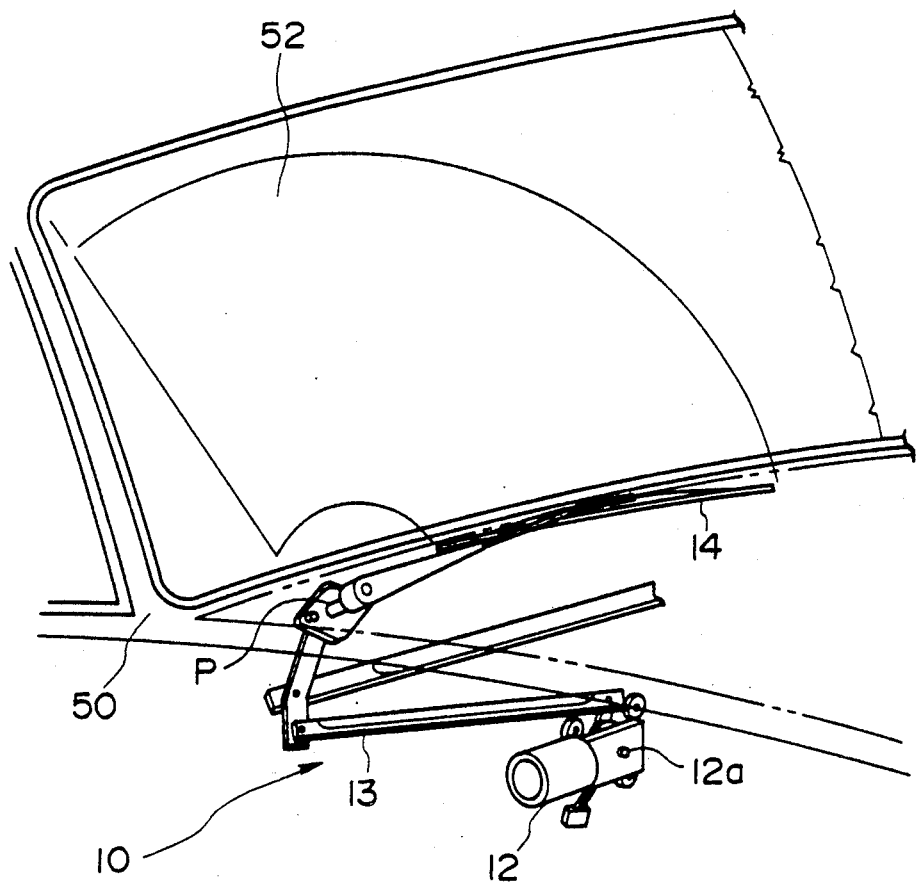
FIG. 3 is an exterior view in the circumference of the wiper motor of the headlamp cleaner shown in FIG. 1.
Figure 4:
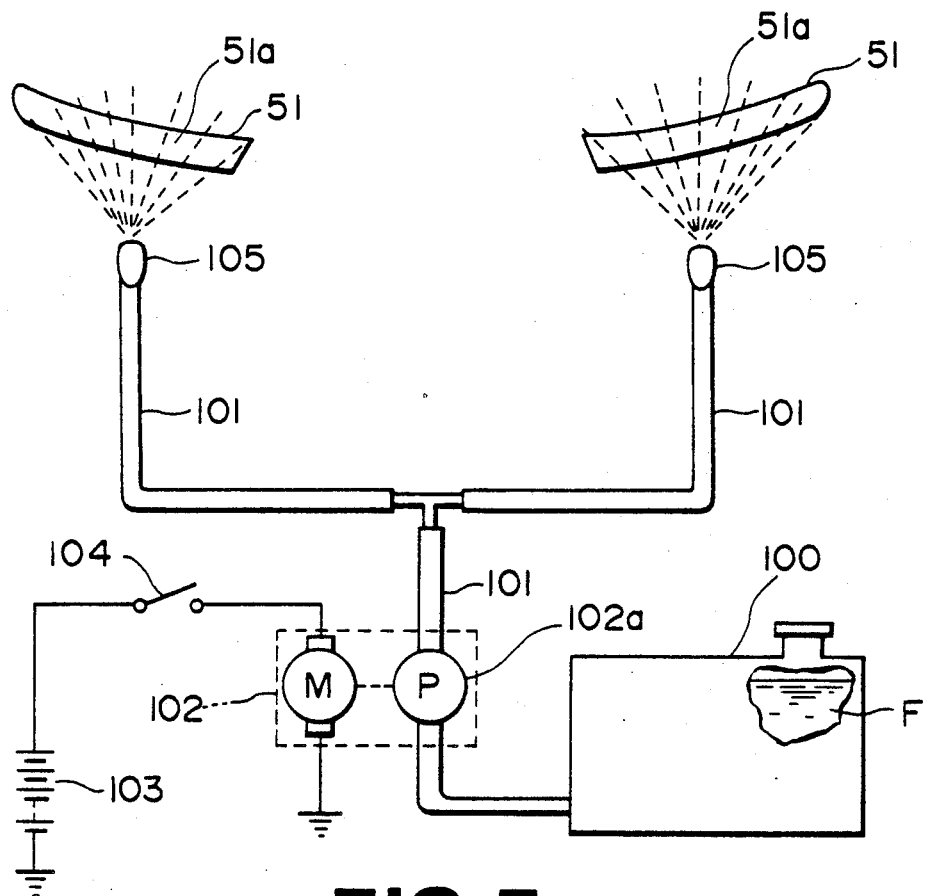
FIG. 4 is a schematic illustration of the conventional headlamp cleaner.

Numeral 10 is a wiper apparatus which wipes the windshield 52 with a wiper blade 14 rotating oscillatively round a pivot shaft P attached rotatably to the vehicle body 50 through a wiper linkage 13 connected to an output shaft 12a of a wiper motor 12 by actuating the wiper motor 12 according to the operation of a wiper switch 11 as shown in FIG. 3.

Numeral 15 is a controller for the wiper apparatus 10, which is a control means for interlocking the wiper motor 12 to the operation of the headlamp cleaner switch 5 and for actuating the wiper motor 12 provided to the wiper apparatus 10 to wipe the windshield 52 with the wiper blade 14 when a predetermined time elapses after the ON-operation of the headlamp cleaner switch 5 and for actuating said wiper motor 12 for a predetermined time after the OFF-operation of said headlamp cleaner siwtch 5 by the function of the first and the second timer means provided to the controller 15.

Said controller 15 is provided with a IC 15a and external terminals ①, ②, ③, ④, ⑤, ⑥, ⑦, ⑧ and ⑨ connected to said IC 15a.

The external terminal ① connected with a No.1 terminal of the IC 15a provided to the controller 15 is connected to a terminal I of the wiper switch 11, and the external terminal ③ connected with a No. 3 terminal of the IC 15a is connected to a terminal E of the wiper switch 11, that is a ground terminal.

The external terminal ④ connected with a No. 4 terminal of the IC 15a provided to the controller 15 is connected to a line terminal 12a of the wiper motor 12 provided to the wiper apparatus 10, and a LOW-terminal 12b and a HIGH-terminal of the wiper motor 12 are connected to a terminnal L and a terminal H of the wiper switch 11, respectively. The external terminal ⑤ connected with a No. 5 terminal of the IC 15a is connected to the power source 8 through the fuse 6 and the main switch 7, and connected to a fixed contact 12e of an auto-stop switch 12d housed in the wiper motor 12.

The external terminal ⑦ connected with a No. 7 terminal of the IC 15a provided to the controller 15 is connected to a movable contact 12f of the auto-stop switch 12d housed in the wiper motor 12, and said movable contact 12f of the auto-stop switch 12d is in contact with another fixed contact 12g grounded.

A No.6 terminal of the IC 15a provided to the controller 15 is connected with one end of a resister $R_1$, another end of the resistor $R_1$ is connected with respective one ends of a resistor $R_2$ and a diode $D_1$ connected in parallel and another end of the resistor $R_1$ is grounded through a condenser $C_1$, thereby a timer circuit which is a first timer means is formed.

Other ends of the resistor $R_2$ and the diode $D_1$ connected in parallel are connected with external terminals ⑧ and ⑥, the external terminal ⑥ of the controller 15 is connected to a terminal W of the wiper switch 11 through a diode $D_3$. A line terminal 3b of the washer motor 3 is connected to the power source 8 through the main switch 7 and the fuse 6, another line terminal 3c of the washer motor 3 is grounded through the headlamp cleaner switch 5 and connected with the external ⑧ through a diode $D_2$.

The external terminal ⑨ connected with the power source 8 through the main switch 7 and the fuse 6 is connected to a No.2 terminal of the IC 15a through a relay coil RL and connected to the external terminal ⑥ through a resistor R3. The external terminal ② connected with a movable contact RL1 of a relay is connected to a terminal S of the wiper switch 11, a normal-closed contact RL2 is connected to the external terminal ⑦ and a normal-opened contact RL3 is connected to a No.5 terminal of the IC 15a and to the external terminal ③ grounded, respectively. A No. 8 terminal of the IC 15a is grounded through a resistor R4 and a condenser $C_2$, thereby another timer circuit which is a second timer means is formed.

Additionally, numeral 16 is a windshield washer for spraying detergent liquid on the windshield 52.

Figure 2A:
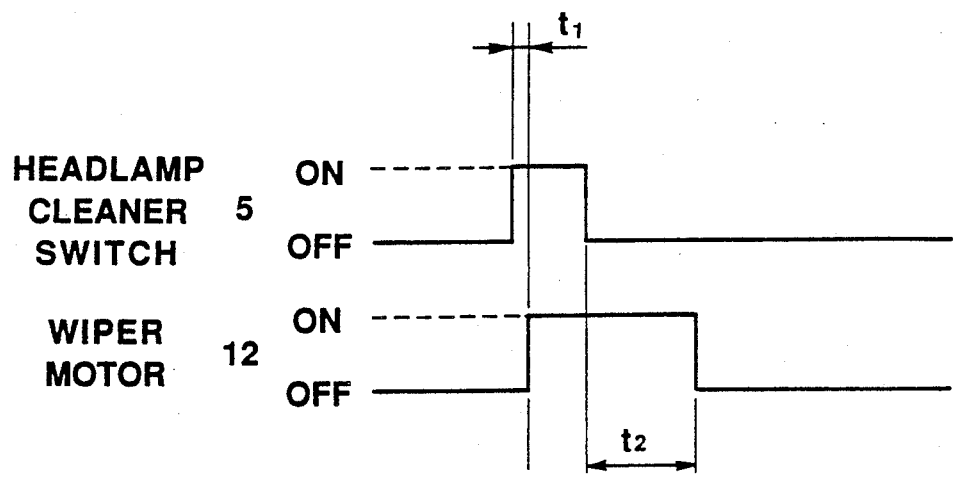
FIG. 2(a) and 2(b) are time charts between the headlamp cleaner switch and the wiper motor in the headlamp cleaner shown in FIG. 1.
Figure 2B:
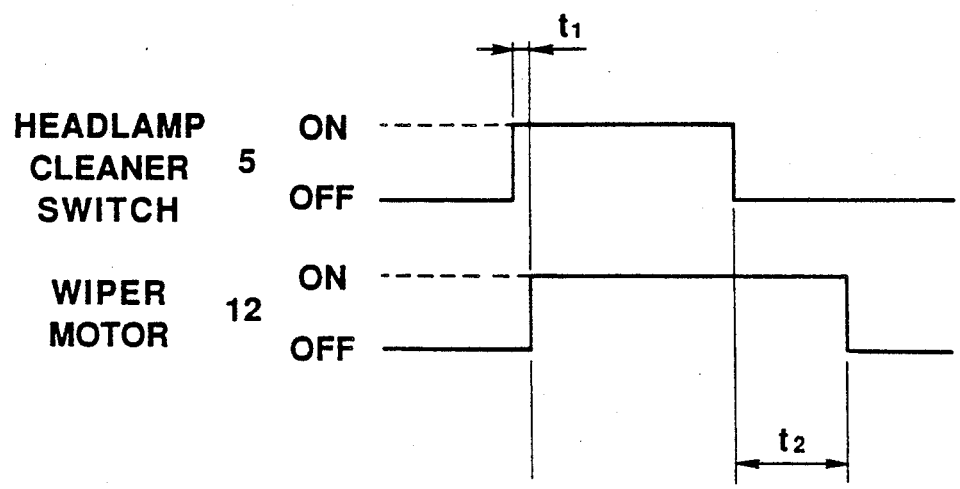

Hereupon, the controller 15 is designed so as to control on basis of time charts shown in FIGS. 2(a) and 2(b).

Namely, switching off the headlamp cleaner switch 5 after switching it on from off, the electric power is supplied to the line terminal 12a of the wiper motor 12 form the exterminal terminal 4 according to output from the No. 4 terminal of the IC 15a provided to the controller 15 when time $D_1$ elapses after switching the headlamp cleaner switch 5 on from off, and the output from said No. 4 terminal of the IC 15a of the controller 15 is discontinued when time $D_2$ elapses after switching the headlamp cleaner 5 off from the on-state.

First of all, switching the headlamp cleaner switch 5 of the headlamp cleaner 1 on from the off-state in the on-state of the main switch 7, the electric power is supplied to the line terminal 3b of the washer motor 3 from the power source 8 through the main switch 7 and the fuse 6, thereby the detergent liquid F stored in the reservoir 2 is fed to the jet 9 through the feeding pipe 4 and sprayed toward the headlamp 51 through the jet 9 by actuating the washer pump 3a.

In this time, the condenser $C_1$ forming the first timer circuit together with the resistor $R_2$ is charged at a voltage of the power source 8 by the ON-operation of the main switch 7. The condenser $C_1$ is discharged through the resistor $R_2$ and drops into a prescribed voltage by said ON-operation of the headlamp cleaner switch 5, and the electric power is applied to the wiper motor 12 through the No. 5 terminal and the No.4 terminal of the IC 15a after the predetermined time $t_1$, the No. 2 terminal is connected to the No. 3 terminal of the IC 15a and grounded by a potential drop of the No. 6 terminal of the IC 15a, thereby the wiper motor 12 is actuated so that the detergent liquid F which is splashed rearward from the headlamp 51 and sticks on the windshield 52 may be wiped off by the wiper blade 14.

The connection between the No. 5 terminal and the No. 4 terminal of the IC 15a is held while the potential of the No. 8 terminal of the IC 15a is maintained at the voltage of the power source 8 even when the potential of the No. 6 terminal of the IC 15a rises by the charging of the condenser $C_1$ according to the OFF-operation of the headlamp cleaner switch 5. The second timer circuit which consists of the resistor $R_4$ and the contenser $C_2$ and is connected to the No. 8 terminal of the IC 15a cuts the connection between the No. 5 terminal and the No. 4 terminal and the connection between the No. 2 terminal and the No. 3 terminal of the IC 15a when the predetermined time $t_2$ elapses after the OFF-operation of the headlamp cleaner switch 5 by a potential drop of the No. 8 terminal of the IC 15a. Thereby, the wiper blade 14 stops at the stated position by means of the auto-stop switch 12d.

As described above, the headlamp cleaner according to this invention is provided with a control means for interlocking a wiper motor of a wiper apparatus to operation of said headlamp cleaner switch. The control means is provided with a first timer means for actuating the wiper motor when a predetermined time elapses after the ON-operation of said headlamp cleaner switch, and a second timer means for cutting the power supply to the wiper motor when a predetermined time elapses after the OFF-operation of said headlamp cleaner switch in a preferred aspect of this invention. Therefore, the detergent liquid can be wiped away from the windshield surface by actuating the wiper blade of the wiper apparatus under the control by the control means even if the detergent liquid sprayed on the headlamp sticks on the windshield. Accordingly, an excellent effect can be obtained since it is possible to drive motor vehicles in safety without obstructing the driver's front sight.

What is claimed is:

1. A headlamp cleaner for washing a headlamp by spraying detergent liquid stored in a reservoir against a headlamp lens through a jet which comprises:
    a washer motor for driving a washer pump to feed the detergent liquid;
    a headlamp cleaner switch for supplying electric power to said washer motor; and
    a control means provided with a first timer means for actuating a wiper motor of a windshield wiper apparatus in response to ON-operation of said headlamp cleaner switch, after a predetermined time interval elapses.

2. A headlamp cleaner as set forth in claim 1, wherein said control means is further provided with a second timer means for cutting the power supply to the wiper motor of the windshield wiper apparatus when a predetermined time interval elapses after OFF-operation of said headlamp cleaner switch.

3. A method of cleaning a headlamp and actuating a windshield wiper comprising:

spraying detergent liquid stored in a reservoir against a headlamp lens through a jet by actuating a washer motor according to ON-operation of a headlamp cleaner switch;

actuating a wiper motor of a windshield wiper apparatus in response to ON-operation of said headlamp cleaner switch after a predetermined time interval elapses by a first timer means provided in a controller; and cutting a power supply to said wiper motor of the windshield wiper apparatus by a second timer means provided in the controller when a predetermined time interval elapses after OFF-operation of said headlamp cleaner switch.

* * * * *